July 28, 1942.	H. H. CURRY	2,290,867
CONTROL FOR POWER PLANTS
Filed Nov. 4, 1938	4 Sheets-Sheet 1

Inventor
Herman H. Curry
By J. Mothershead
Attorney

July 28, 1942.                H. H. CURRY                2,290,867
                         CONTROL FOR POWER PLANTS
                           Filed Nov. 4, 1938          4 Sheets-Sheet 2
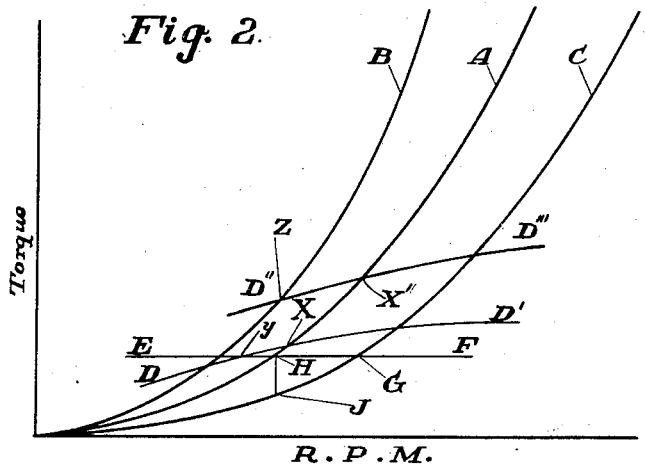
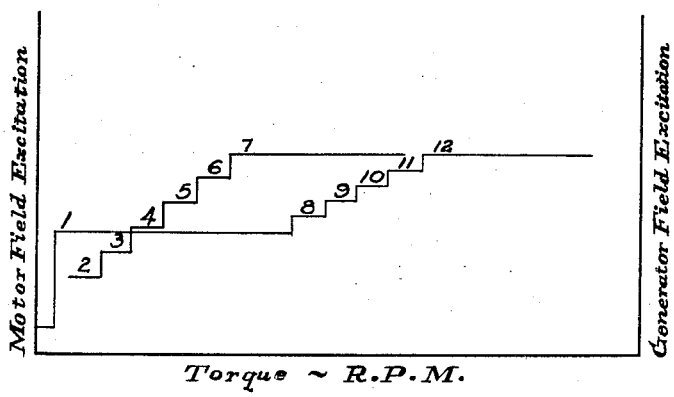
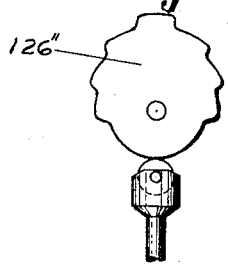
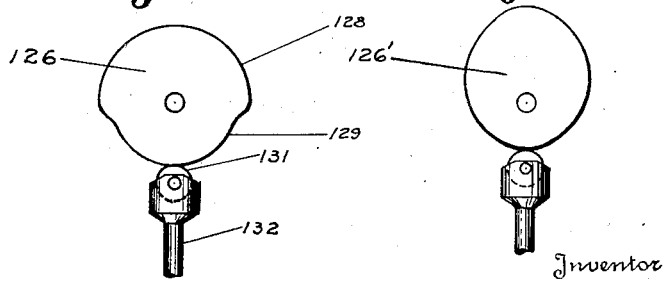
Inventor
Herman H. Curry
By  J. F. Mothershead
                                                        Attorney

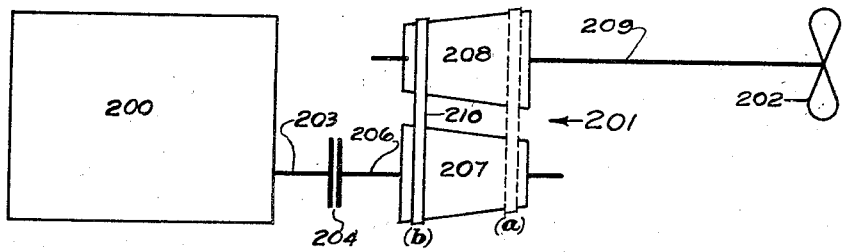
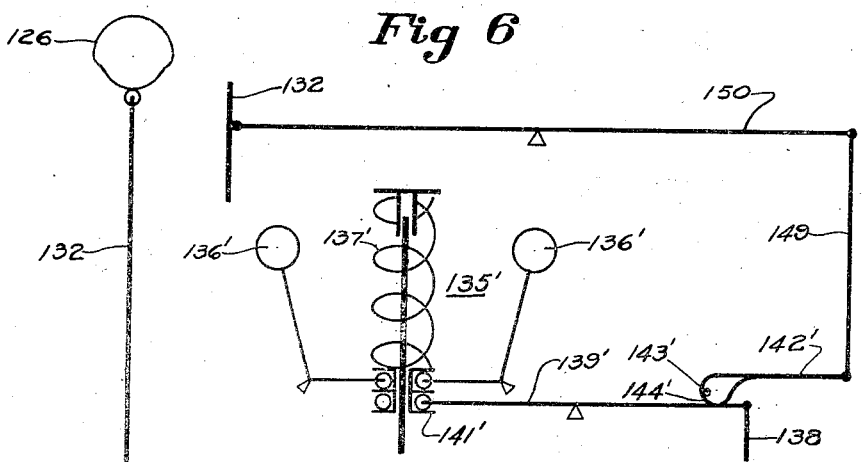
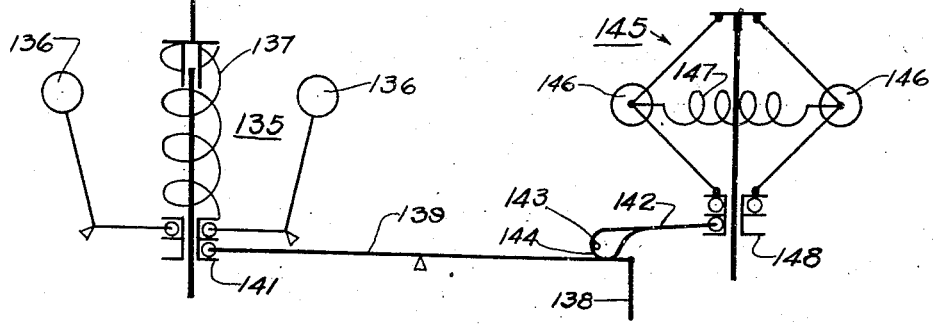

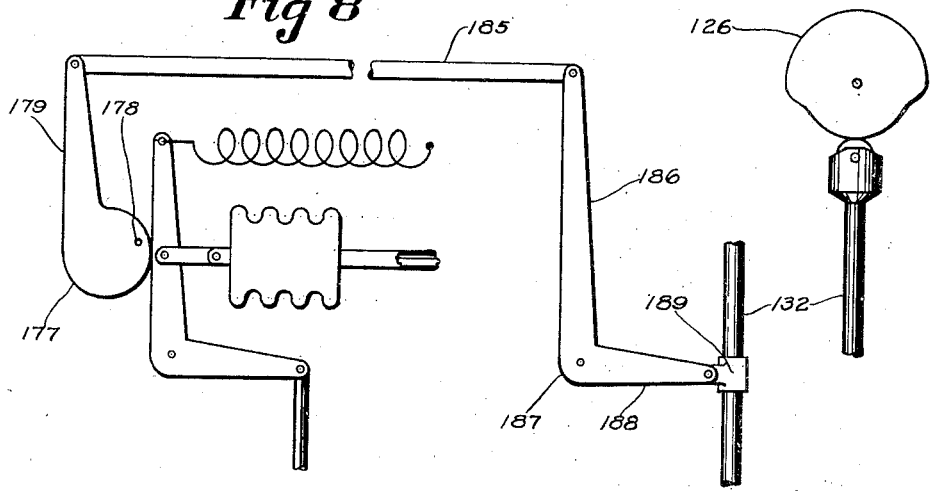
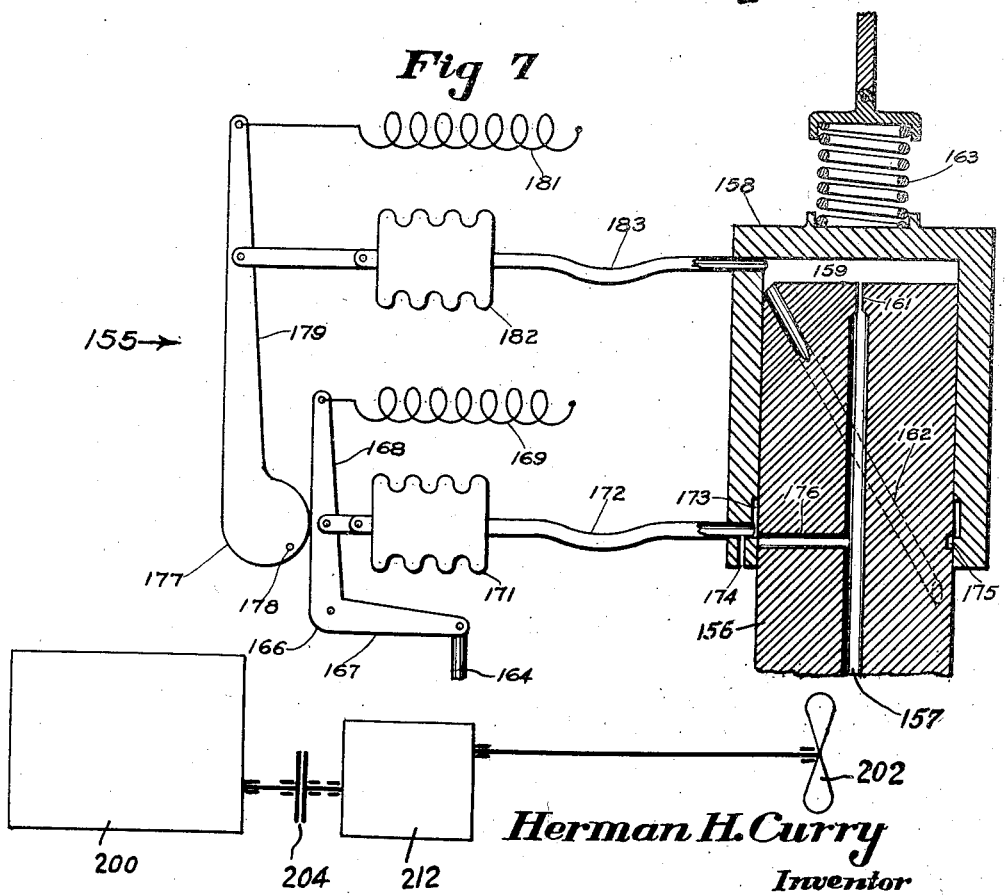

Patented July 28, 1942

2,290,867

UNITED STATES PATENT OFFICE 2,290,867

CONTROL FOR POWER PLANTS

Herman H. Curry, Pittsburgh, Pa.

Application November 4, 1938, Serial No. 238,815

39 Claims. (Cl. 290—17)

(Granted under the act of March 3, 1883, as amended April 30, 1928; 370 O. G. 757)

This invention relates to controlling and to coordinating the torque and speed of variable speed prime movers for driving loads at variable speed through variable ratio transmissions. The invention also relates to the production of mechanical power for driving a load, such for example, as a marine propeller, an air propeller, a rotary liquid pump, a blower or other device in which the torque increases with speed. In one aspect, the invention relates to installations of the type comprising a prime mover and a variable transmission for driving a load whose torque increases with speed. In a more specific aspect, the invention relates to power plants and to means for and a method of controlling a power plant which is adapted to supply power for driving a load whose torque increases with speed. A marine propulsion plant, comprising an electric motor for driving a marine propeller, a generator for supplying electrical energy to the motor, and a prime mover for driving the generator, when constructed in accordance with this invention and considered in its broader aspects, is fairly representative of the general class of apparatus to which this invention applies. In a marine propulsion plant of this general class, a ship's propeller may be connected directly or otherwise for operation by the motor, and in this event the motor is substantially continuously under a load requiring power substantially in accordance with the torque-R. P. M. characteristic of the propeller. For propelling the ship at substantially constant speeds the power made available at the motor should be substantially that required by the propeller. If the power available at the motor exceeds that required by the propeller for a particular speed, the propeller will accelerate and increase the speed of the ship; while if the power available is less than that required by the propeller at a particular speed, the propeller will necessarily decelerate, and of course the speed of the ship will decrease.

Arrangements and modes of operation proposed and sometimes used to meet these comparatively few requirements usually lack proper coordination between the requirements and features inherent in the construction, or in the principles of operation, either of the electrical machines, or of the prime mover; or the correlation of these machines may be such as to cause one or more of them to operate inefficiently. The purposes of this invention are to provide for overcoming disadvantages of the kind just discussed, and to provide for improving the construction, relative arrangement of parts, and the efficiency of apparatus of the class described.

It is also highly desirable to be able to control the operation of apparatus of the class described from a single control or operating member which, in a marine propulsion plant, for example, may be located on the bridge or in the pilot house of the ship. It is an important object of this invention to provide apparatus, such as a power plant of this general class in which the controls for the individual machines are responsive in properly timed relation to movement of a single operating member, which may be located at a point remote from the power plant.

In a power plant constructed in accordance with this invention there may be a definite relation between the prime mover, the generator and the motor, so that the latter may operate under a variable load and provide the torque required for operation at predetermined substantially constant speeds as well as for acceleration and deceleration; the generator may supply the electrical energy requisite for operation of the motor in this manner; the prime mover may provide adequate power for driving the generator at the variable torques and speeds caused by variations in the electrical energy required for operation of the motor at the same or different speeds; and the entire plant may be responsive to a single operating member.

The features of the invention are illustrated in the accompanying drawings, wherein:

Fig. 1 is a diagrammatic view of a marine propulsion plant, showing the control drums in developed plan;

Fig. 2 is a view of a graph showing torque-R. P. M. characteristics of a propeller under different conditions;

Fig. 3 is a graph illustrating the sequence of the excitation of the generator field and of the motor field;

Fig. 4 is a face view of a cam and its follower which may be utilized for changing the speed of the prime mover.

Figs. 4a and 4b are views similar to Fig. 4, showing different types of cams suitable for use with this invention;

Fig. 5 is a diagrammatic view with parts omitted for purposes of illustration, showing a governor for controlling the speed of a prime mover and for limiting the maximum amount of energy made available per cycle, as per working stroke of a reciprocating engine, as a function of prime mover speed when operating in the upper range of load speeds, as in the upper range of propeller speeds;

Fig. 6 is a diagrammatic view with parts omitted for purposes of illustration, showing a governor for controlling the speed of a prime mover and for limiting the maximum amount of energy made available per cycle, as per working stroke of a reciprocating engine, as a function of control setting when operating in the upper range of load speeds as in the upper range of propeller speeds;

Fig. 7 is a sectional elevation of a hydraulic governor adapted to control a prime mover in the same manner as the governor illustrated in Fig. 5;

Fig. 8 is a detail elevational view illustrating the manner in which the hydraulic governor shown in Fig. 7 may be modified to control a prime mover in the same manner as the governor illustrated in Fig. 6;

Fig. 9 is a diagrammatic view of an embodiment of the invention in which a mechanical, variable speed gear is substituted for the generator-motor transmission shown in Fig. 1; and Fig. 10 is a diagrammatic view of another embodiment in which a hydraulic device is substituted for the generator-motor transmission shown in Fig. 1.

Figure 1:
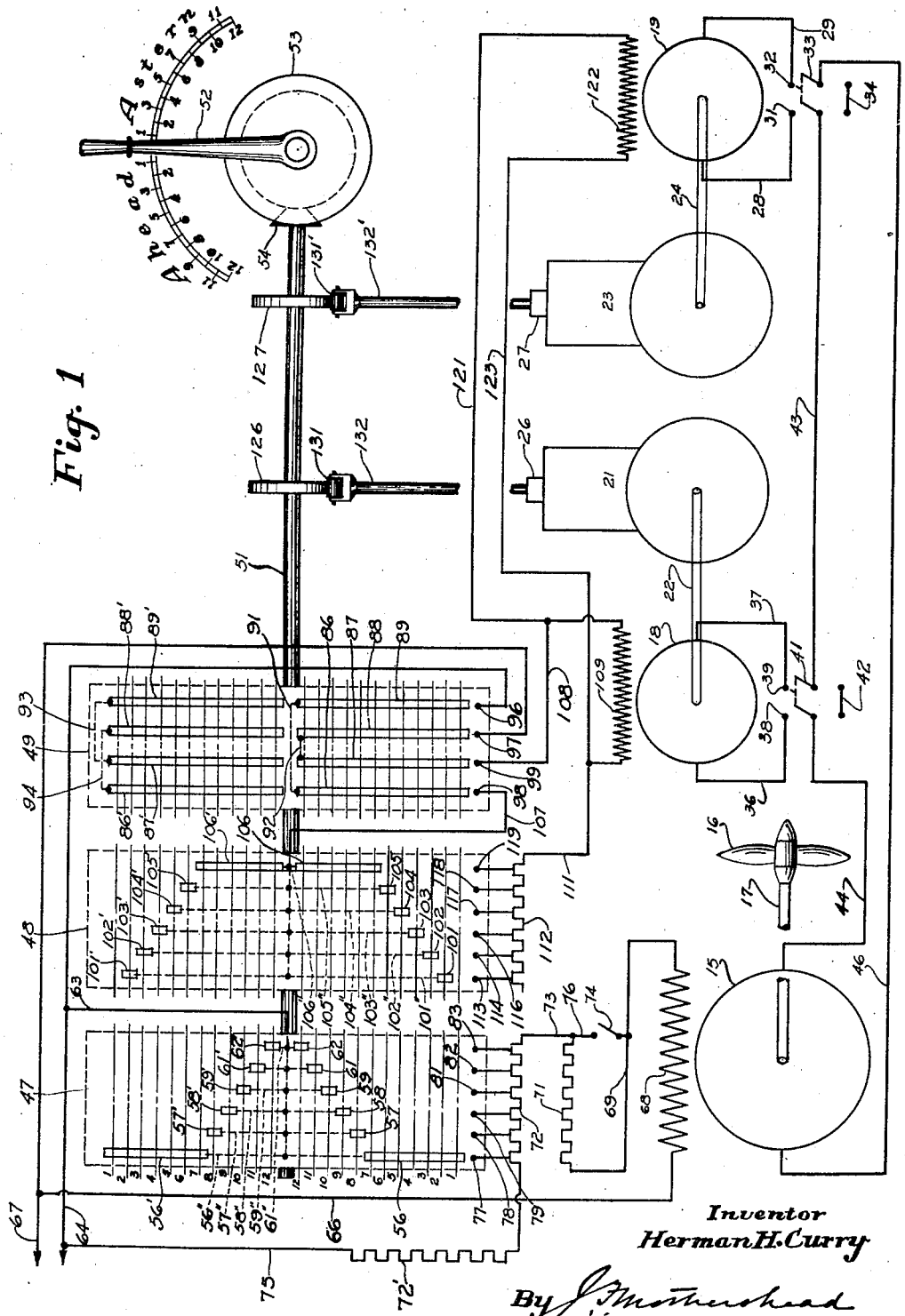

A marine propulsion plant has been selected for illustration in Fig. 1. This plant comprises a direct current, separately excited, propulsion motor 15, which may constitute the main propulsion motor of a single screw ship. A propeller 16 may be fixedly mounted upon a shaft 17 which may form an extension of, or be directly connected to the armature shaft of the motor. Separately excited, direct current generators 18 and 19 may be arranged for supplying electrical energy to the motor individually, or these generators may be connected in series, if this is desired. A prime mover 21, in the form of a Diesel engine, may be connected by means of a shaft 22 for driving the generator 18, and similarly, a Diesel engine 23 may constitute a prime mover which may be connected by a shaft 24 for driving the generator 19.

In order to assure efficient operation of these prime movers, they may be regulated to maintain substantially constant speeds of rotation at a plurality of predetermined speeds, as at a low speed which may be the idling speed of the engines, and at a higher speed which may be the full speed of the engines. Preferably, this is accomplished by limiting the maximum amount of energy made available per cycle or per working stroke and varying the amount of energy made available per cycle up to the limited maximum in accordance with the variation in the demand for power. For this purpose, the prime movers 21 and 23, whether of the reciprocating engine type as shown or of a rotary type, as an elastic fluid turbine, may be equipped with suitable governors 26 and 27, respectively, of the so-called constant speed type, preferably spring balanced centrifugal governors which respond to changes in speed to vary, up to the limited maximum permitted by the setting of the governor, the amount of operating fluid supplied per energy conversion, as per cycle or per working stroke, to the energy conversion chambers of a prime mover, as to the cylinders of a reciprocating engine as shown, or to the blading of an elastic fluid turbine. The operating fluid may be any appropriate energy conveying medium, as fuel for an internal combustion engine, or a pressure fluid such as steam for an elastic fluid turbine.

The circuits for supplying electrical energy from the generators to the motor may comprise conductors 28 and 29 leading from the brushes of the generator 19 to contacts 31 and 32 for a double pole, double throw switch 33, which is adapted to complete the circuit to this generator when the switch is closed on these contacts. This switch may also be thrown to its opposite position in which it completes a circuit through a shunt 34 and leaves the generator 19 disconnected from the motor. Likewise, conductors 36 and 37 may be arranged to extend from the brushes of the generator 18 to contacts 38 and 39 for a double pole, double throw switch 41 which is adapted to complete the circuit to this generator when the switch is closed on these contacts. This switch may also be adapted when thrown to its opposite position, to complete a circuit through a shunt 42 and thereby leave the generator 18 disconnected from the motor. From one terminal of the switch 33, a conductor 43 extends to one terminal of the switch 41, and from the other terminal of the latter switch a conductor 44 extends to the motor 15. A conductor 46 extends between the motor and the switch 33 of the generator 19.

Apparatus for controlling the operation of this power plant may comprise contact drums 47, 48 and 49 fixedly mounted in suitably spaced relation along a rotary shaft 51. Two of these drums, as the drums 47 and 48, may be arranged to cooperate in controlling the torque and speed of the propulsion motor, while the drum 49 may function as a reversing switch to provide the same number of speeds ahead and astern. The shaft 51 and the contact drums mounted thereon may be operated from any convenient location, as from some remote point, such as the bridge or the pilot house of a ship by means of a single operating member, here shown in the form of a control lever 52 cooperating with suitable means for transmitting motion between this lever and shaft 51. In the illustrated embodiment this motion transmitting means is exemplified by a large bevel gear 53 which is fixed to the lever and coaxial with the fulcrum point of the lever, and a smaller bevel gear 54 fixed on the shaft 51 and meshing with gear 53. This lever may be operable through a suitable arc or quadrant along which at the positions for various speeds there may be notches (not shown) to receive the lever, and these notches may be identified by suitable indicia, such as numerals. Thus in the illustrated embodiment, when the lever is in a vertical position as shown, the propulsion motor is not operated and the ship is not in motion, but when the lever is moved in either direction from this position the propulsion motor is operated and the ship is under way.

The illustrated embodiment provides for the same number of speeds forward, as astern, and, therefore, an equal number of contacts is symmetrically disposed about opposite halves of each of the drums 47 and 48. Thus, the lower half of the drum 47, as viewed in Fig. 1, may be provided with a relatively long contact segment 56, and with relatively short contact segments 57, 58, 59, 61 and 62 and similarly arranged segments 56', 57', 58', 59', 61' and 62' may be disposed about the upper half of this drum. A conductor 63 extending from the line 64 to the drum 47 may be connected to segments 56 and 56' by a conductor 56'', to segments 57 and 57' by a conductor 57", to segments 58 and 58' by a conductor 58'", to segments 59 and 59' by a conductor 59'", to segments 61 and 61' by a conductor 61'", and to segments 62 and 62' by a conductor 62'". A conductor 66 extends between the line 67 and the field winding 68 of the propulsion motor 15. A conductor 69 extends between the motor field winding and a resistance 71. A resistance 72 is connected to the resistance 71 by a conductor 73, and a switch 74 is interposed in a conductor 76 extending between the conductor 69 and the conductor 73. The resistance 72 may be provided with contactors 77, 78, 79, 81, 82 and 83 which are engageable with the segments on the drum 47. Preferably, means are also provided for maintaining a relatively weak field on the propulsion motor 15 at all times. This may be accomplished conveniently by supplying electrical energy from the line 64 through a conductor 75 and a suitable resistance 72' to the resistance 72 from which a circuit is completed through the conductor 73, resistance 71, conductor 69, the motor field winding 68 and conductor 66 back to the line 67.

Each half of the drum 49 may be provided with four contact segments 86, 87, 88, 89 and 86', 87', 88' and 89', respectively, which preferably are of substantially the same length. The segments 86 and 89 may be connected by a conductor 91, the segments 87 and 88 may be connected by a conductor 92, the segments 87' and 89' may be connected by a conductor 93, and the segments 86' and 88' may be connected by a conductor 94'. The lines 64 and 67 may be provided with contactors 96 and 97, respectively, which are engageable with the segments 89 and 88, respectively, or with segments 89' and 88', respectively, depending upon the direction in which this drum is rotated. Similarly, contactors 98 and 99 are engageable with segments 86 and 87, respectively, or with segments 86' and 87', respectively, depending upon the direction in which the drum is rotated.

Contact segments 101, 102, 103, 104, 105, 106 and 101', 102', 103', 104', 105' and 106' may be symmetrically arranged about opposite halves of the drum 48. Preferably, the segments 106 and 106' are relatively long, while each of the remaining segments is comparatively short. A conductor 107 may extend between the contactor 98 and the drum 48 and be connected individually to segments 101 to 106 inclusive and to segments 101' to 106', inclusive, by conductors bearing the same reference characters as the segments connected, but having double prime marks. A conductor 108 may extend between contactor 99 and the field winding 109 of generator 18, and a conductor 111 may extend between this field winding and a resistance 112 having contactors 113, 114, 116, 117, 118, and 119 engageable respectively with the segments 101 to 106, inclusive, or with segments 101' to 106', inclusive, depending on the direction in which the drum 48 is rotated. A conductor 121 may extend between conductor 108 and the field winding 122 of the generator 19, and a conductor 123 may extend between this field winding and conductor 111.

In order that the governors 26 and 27 of the prime mover may be responsive to movement of the operating member or control lever 52, the rotary shaft 51 may be equipped with suitable cams 126 and 127. As these cams and their associated parts may be, and preferably are identical, only the cam 126 and parts cooperating therewith are described in detail herein, it will be understood that cam 127 and its associated parts function in the same manner, and therefore the same reference characters as applied to the cam 126 and its associated parts, are applied to cam 127 and its associated parts, but in the latter case the reference characters bear prime marks. The cam 126 comprises a rise 128 (Fig. 4) and a depression 129. A follower roller 131 is carried by a push rod 132 and adapted to ride over the rise and depression of this cam as the shaft 51 is rotated. The push rod 132 may be urged upwardly by the spring (not shown) of the governor 26, the arrangement, preferably, being such that when the follower 131 is on the depression 129 of the cam, the push rod 132 holds the governor spring in a position to cause the governor 26 to control the prime mover 21 for operation at a predetermined low substantially constant speed, while when the follower 131 is on the rise of the cam, the push rod 132 is depressed accordingly, and this depression of the push rod adjusts the governor spring to control the prime mover 21 for operation at a predetermined higher, substantially constant speed.

While the cams 126 and 127 have been disclosed as being of a type adapted to adjust the governors to control the prime movers only at two speeds, it will be understood this is merely illustrative of the invention, as cams or other devices may be provided to adjust the governors to control the speed in any desired manner. For example, an eccentric cam, such as the cam 126' (Fig. 4a) may be substituted for the cam 126 of Fig. 4 when it is desired to adjust the governors to progressively increase the speed as a function of control setting. On the other hand, these cams may be shaped to adjust the governors to increase the speed in a series of definite steps. The cam 126" of Fig. 4b is adapted to function in this manner.

When a power plant of the class described herein is used for propelling a ship, the torques required for operating the ship's propeller at various predetermined speeds and under different loads may, of course, be known. For instance, the curve A in Fig. 2 may represent the torque-R. P. M. characteristic of the propeller under normal load, the curve B may represent the torque-R. P. M. characteristic under heavier loads, such as those imposed when towing or ice breaking, for example, and the curve C may represent the torque-R. P. M. characteristic of the propeller under light loads. The probable divergence of these curves is exaggerated for the purpose of illustration. In order that the propulsion motor, the generator or generators, and the prime mover or prime movers may function efficiently, the speed of the prime mover should always be adequate for the power required, but not excessive. For stable operation, the slope of a curve representing the torque available at the motor, such as D—D', should not exceed the slope of the curve, such as curve A, representing the torque required by the propeller. For example, if the curve D—D' (Fig. 2) represents the torque available at the motor for operating the propeller under normal load, as indicated by curve A, it will be seen that for a portion of its length curve D is above curve A and, therefore, when operating over that portion of the curve D above A, there will be more torque available at the motor than is required by the propeller for constant speed. This excessive torque is consumed in accelerating the propeller until a point is reached, as indicated at X, where the curves A and D intersect, and under these conditions, the operation will be unstable at speeds below or above that indicated by this point X, and the speed will return to and operate stably at X after a momentary disturbance.

In accordance with this invention, the propulsion motor may be controlled to deliver torque adequate for operating the propeller at predetermined speeds with stable operation, electrical energy may be generated and supplied to the motor in a manner to meet the demand for power without substantially exceeding the minimum R. P. M. of the prime mover required for this power, and the prime movers may be controlled to drive the generators so as to provide adequate, but not excessive power for operating the motor at predetermined speeds. These desirable objectives may be attained by properly limiting the torque of the prime mover and adjusting the transmission ratio to obtain the desired load speed. These objectives may also be closely approximated by properly coordinating the speed of the prime mover through adjustment of the speed governor setting with the transmission ratio between the prime mover and the load to obtain each desired speed of the load. This latter method of operation does not require a load torque which increases with speed, for stable operation. Some of the more specific aspects of this invention involve one or the other of the above methods of obtaining these results.

An important advantage resulting from this principle and mode of operation is that the prime mover may be operated at the minimum speed at which adequate power is developed for particular conditions of operation. For example, in the conventional Ward Leonard system, the prime movers always operate at the constant and relatively high speed required for full power. In other words, with the Ward Leonard system, even when no power is being taken from the prime mover, the latter operates at the same constant and relatively high speed as when full power is required. This operation at full speed produces greater wear on all moving parts and also adds greatly to the difficulty of uniformly metering and atomizing the fuel to the various cylinders of a Diesel engine, for example, at low mean effective pressures and at low loads. The inertia forces increase with the square of the rotative speed and this also increases the wear on the moving parts. It will be evident, therefore, that the present invention provides for overcoming these objectionable features of the Ward Leonard system by operating the prime mover at higher mean effective pressures and lower revolutions when less than full power is required. This simplifies the problem of fuel distribution to obtain uniform power from each cylinder of a multiple cylinder engine. Furthermore, with the Ward Leonard system with the generator operating at constant speed, to increase the motor speed above that corresponding to full generator field, the motor field must be reduced, whereas in accordance with this invention, the motor field is increased to give higher motor speeds, and the generator speed is also increased with full field on the generator. Both the motor and the generator are using material to full advantage at full power as distinguished from the Ward Leonard system where the motor field is reduced for speeds above that corresponding to the full generator field condition, and therefore at these higher speeds, some of the available motor field is not used.

For steady running conditions, in accordance with this invention, the torque required to drive the generator should be substantially equal to the torque produced by the prime mover driving the generator. When the generator is driven by a reciprocating engine, such as a Diesel engine, operating at substantially constant mean effective pressure, the power developed by the engine varies as the engine revolutions, at constant torque. The torque output of the propulsion motor is approximately equal to its armature current I × a constant A × the motor field; and the generator torque is also approximately equal to its armature current I × a constant B × the generator field. In a set of the kind described, comprising a motor receiving electrical energy directly from a generator, the armature current is the same for the motor and for the generator, therefore, $$\frac{\text{Generator torque}}{\text{Motor torque}} = \frac{I \times B \times Fg}{I \times A \times Fm}$$

where $Fg$=field of generator and $Fm$=field of motor.

Since the armature currents are the same, they cancel out, and $$\frac{Tg}{Tm} = \frac{BFg}{AFm}$$

where $Tg$=torque of generator and $Tm$=torque of motor. Therefore, $$Tm = \frac{ATgFm}{BFg}$$

Let $$\frac{A}{B} = C$$

and substitute $$Tm = \frac{CTgFm}{Fg}$$

For each position of the control lever 52 (Fig. 1) there is a corresponding position of field rheostats and a corresponding ratio of field strengths, and thus for each position of the control lever, the torque available at the propulsion motor will equal the prime mover torque multiplied by a corresponding factor, i. e., $$\frac{CFm}{Fg}$$

since the generator torque must equal the prime mover torque for steady running conditions, and prime mover torque is fixed by the governor and a fuel limiting stop. Stable propeller speed for each control position will occur where the curve of the prime mover torque (not shown) multiplied by the factor corresponding to the control position crosses the propeller torque curve. The speed of the prime mover must necessarily be that furnishing the required power so that the curves of the propeller power percentages also represent curves of per cent of full power of the prime mover in R. P. M. (neglecting variable transmission efficiency and for the sake of illustration, using constant B. M. E. P.) within the range of prime mover speeds not limited by the governor, that is, within the range where a constant amount of energy is made available per cycle, as where a constant amount of fuel per working stroke may be supplied to an internal combustion engine, when this type of prime mover is used. As soon as the governor limits the speed of the prime mover by limiting the energy available per cycle, as the fuel per working stroke, the system acquires characteristics similar to those of the conventional Ward Leonard system.

The principle of a power plant of the class described herein and the preferred modes of applying that principle may be further illustrated by the graphs shown in Fig. 3. From this view, it will be seen that the desirable objectives of this invention may be attained by controlling the excitation of the fields of the motor and of the generator (or generators) so that the excitation of the motor field remains constant at a low value while the excitation of the generator field may be successively increased while the generator is driven at a predetermined substantially constant low speed to provide power for operating the propeller at a lower range of speeds, such as those used for manoeuvering; and when the field of the generator is fully excited, the speed of the generator may be increased to a predetermined higher speed, such as the full speed of the prime mover and the excitation of the motor field may be successively increased to full field excitation, if desired, for operating the motor to propel the ship at cruising speeds, or for any particular duty, as for towing, ice breaking, etc.

For the purposes of illustration, consider that the control lever 52 (Fig. 1) may be moved from its neutral (vertical) position as shown, either clockwise or counterclockwise through twelve positions, which are indicated by the numerals 1 to 12, inclusive, in Figs. 1 and 3. When the lever 52 is moved into the first notch, or to its No. 1 position, the excitation of the motor field is built up to the desired operating condition by the completion of a circuit from the line 64 through the conductors 63 and 56", the long contact segment 56, contactor 77, resistance 72, conductor 73, resistance 71, conductor 69, the motor field winding 68 and conductor 66 to the line 67. This shorts out the circuit from the line 64 through the conductor 75 and the resistance 72' to the resistance 72. At the No. 2 position the excitation of the motor field remains constant, but the generator field is excited and the generator, of course, is being driven at a predetermined low speed. As the lever 52 is moved successively into the 3rd, 4th, 5th, 6th and 7th positions, the field excitation of the generator is successively increased while the field excitation of the motor and the speed of the generator remain constant. This range of operation may, and preferably does, provide the power for propelling the ship at manoeuvering speeds. The torques developed at these speeds may be represented by those portions of the curves A, B and C of Fig. 2 which are below the horizontal line EF.

When the lever 52 is moved from its 7th to its 8th position, the governor setting of the prime mover, and therefore the speed of the generator may be increased to a predetermined higher constant speed, which may be the full speed of the prime mover, the field excitation of the generator remains constant at its full value, and the field excitation of the motor is increased. Whether the actual speed of the engine attains the aforementioned higher constant speed depends upon the torque ratio. It will be understood from Fig. 3, that as the control lever 52 moves into its 9th, 10th, 11th and 12th positions, the field excitation of the motor is successively increased until it reaches its full value at the 12th position, while the field excitation of the generator remains constant, but generator speed increases in successive increments to full speed. This range of operation provides the speeds and torques represented by those portions of the curves A, B and C of Fig. 2, which are above the line EF.

When the system operates through the lower range of propeller speeds where the motor field excitation remains constant while the excitation of the generator field is changed and the engine operates at its low or idling speed, it will be seen that the operation is similar to the well known Ward Leonard system. When the generator field is fully excited and the propeller speed is increased by increasing the motor field, the ratio between the motor field and the generator field is increased which, as previously explained herein, is the same as multiplying the generator torque by a greater factor to obtain torque available at the propeller, or in Fig. 2, if the curve DD' represent torque available in position 8 of the control lever, moving curve DD' upwardly as to the position D"D" where the torque available curve intersects one of the propeller torque curves, as at X', the system will then operate at this point X'. It will be seen therefore that for each successive increase in the motor field, there will be a torque available curve similar to but above the curve D"D" and, hence, there will be a series of points along the propeller torque curves where the latter are intersected by torque available curves, and in each instance the point of intersection of these curves will indicate the condition at which the system will operate. For this reason, the speed of the prime mover and the speed of the generator increase by successive increments from the low or idling speed of the prime mover to full speed. It will also be evident that although the motor field excitation remains constant while the field excitation of the generator is increased and vice versa, this, in effect, is merely changing the ratio of the field excitation of these two machines. In some instances it may be desirable to change the excitation of the motor and generator fields simultaneously, but at different rates to obtain the same ratio relationships between these fields. It will be understood that in either case, the principle is exactly the same.

Assume, for example, that in the 8th position of the control lever, the propeller requires four times as much torque as that available at the prime mover. This requires a transmission ratio giving a four to one speed reduction from engine speed, and this is provided by the generator and the motor and the proper ratio between their fields. Now if for the next higher propeller speed, the torque required by the propeller is, for example, five times the torque available at the prime mover, assuming constant prime mover torque for purposes of illustration, the transmission ratio between the prime mover and the propeller must be changed from four to five, and this is accomplished by increasing the excitation of the motor field and thereby effecting the desired result by changing the ratio between the fields of the motor and the generator. As previously pointed out, the propeller speed is determined by the intersection of the torque available and the torque required curves, for at this point of operation all of the torque available at the propeller is being utilized to operate the latter at the selected speed.

The principle just described and its preferred mode of application are embodied in and exemplified by the power plant illustrated in Fig. 1. In the operation of this plant, movement of the lever 52 from its neutral position in the counterclockwise direction may be that required for increasing the speed of the ship in a forward direction, while movement of this lever from its neutral position in a clockwise direction may be that required for increasing the speed astern.

Under these conditions, the lower halves of the drums 47, 48 and 49 control the forward speeds, and the upper halves of these drums control the astern speeds. Reversal of the direction of rotation of the propeller is effected by reversing the fields of the generators, and in other respects the operation in each direction is identical in function. Therefore, only the operation of the plant in a direction to propel the ship in a forward direction is described in detail herein.

When it is desired to operate with both generators 18 and 19 supplying electrical energy to the motor, the switch 41 is closed on the contacts 38 and 39, and the switch 33 is closed on the contacts 31 and 32, and the switch 74 is closed to shunt the resistance 71 out of the motor field. Either of the generators may be disconnected from the motor, as by closing the switch 41 of generator 18 across the shunt 42, or by closing the switch 33 of generator 19 across the shunt 34. When this is done, the switch 74 is opened to interpose the additional resistance 71 in the motor field circuit.

When the lever 52 is moved to its No. 1 ahead position, the shaft 51 and the drums carried thereby swing in a counterclockwise direction (viewed from the operating end) until the segment 56 of drum 47 engages the contactor 77 of the motor field resistance 72. The segments 86, 87, 88 and 89 of drum 49 also engage contactors 98, 99, 97 and 96, respectively, but no electrical contact is made with any segment on the drum 48. In this position of the control lever 52, a circuit is completed from the line 64 through the conductor 63 into the drum 47, through the conductor 56″ to the long segment 56, to contactor 77, through all of the resistance 72, conductors 73 and 76 (switch 74 being closed), through the motor field 68 and conductor 66 back to the line 67. The circuit through the generator fields is open at the drum 48. When the lever 52 is moved into its 2nd, 3rd, 4th, 5th, 6th and 7th positions, the circuit just described remains completed, for the contactor 77 remains in engagement with the long segment 56.

When the control lever 52 is moved from its first to its 2nd position, contactor 113 engages segment 101 of drum 48. This completes a circuit from line 64, through contactor 96, segment 89, conductor 91 and segment 86 of drum 49, through contactor 98, conductor 107 to drum 48, through conductor 101″ to segment 101, contactor 113, field resistance 112, conductor 111 to the field winding 109 of generator 18, through conductor 108 and contactor 99 to segment 87 of drum 49, thence through conductor 92 to segment 88, thence through contactor 97 to the line 67. A circuit is also completed from conductor 111 through conductor 123, the field winding 122 of generator 19 and through conductor 121 to conductor 108 and back to the line 67 as just described. It will be evident that the fields of the generators 18 and 19 are in parallel. It will also be evident without further detailed description that as the control lever 52 is moved into its 3rd, 4th, 5th, 6th and 7th positions, drum segments 102, 103, 104, 105 and 106 will successively engage contactors 114, 116, 117, 118 and 119 in the order named, thereby successively reducing that portion of the resistance 112 which remains in circuit with the field windings 109 and 122 of generators 18 and 19, respectively. When the control lever is moved into its 8th, 9th, 10th, 11th and 12th positions, contactor 119 remains in engagement with the long segment 106, and therefore, the fields of both generators are fully excited.

It will also be seen that when the lever 52 is moved into its 8th, 9th, 10th, 11th and 12th positions, the segments 57, 58, 59, 61 and 62 of drum 47 successively engage the contactors 78, 79, 81, 82 and 83 in the order named, thereby successively reducing the resistance in the motor field 68 until full field excitation is obtained when the lever 52 is in its 12th position.

When the lever 52 is moved from its neutral position in a clockwise direction for controlling the astern speeds, the contactors 98, 99, 97 and 96 engage segments 86′, 87′, 88′ and 89′, respectively, of drum 49, thereby completing a circuit from line 64 through contactor 96, segment 89′, conductor 93, segment 87′ to conductor 108 of the field circuit for the generators. This circuit is completed from the conductor 111, the resistance 112, one of the contactors 113, 114, 116, 117, 118 and 119 and one of the drum segments 101′, 102′, 103′, 104′ and 105′ to the conductor 107, thence through the contactor 98 to drum segment 86′, through conductor 94 to segment 88′, thence through contactor 97 to the line 67. It will be evident that this reverses the fields 109 and 122 of the generators 18 and 19, respectively, and of course, this reverses the direction of the propulsion motor.

The cams 126 and 127 which control the governors 26 and 27, respectively, may be so arranged that the follower associated with each cam rides on the depression thereof while the control lever 52 is in any one of its first, 2nd, 3rd, 4th, 5th, 6th or 7th positions, and when the control lever 52 is moved from its 7th to its 8th position and while this lever is in its 8th, 9th, 10th, 11th and 12th positions, the follower associated with each cam rides on the rise thereof. This causes the push rods 132 and 132′ to assume their uppermost positions while the control lever is in any of its first seven positions, and therefore, in this range of operation the governors are adjusted automatically by the push rods 132 and 132′ to control the prime movers for operation at a predetermined low, substantially constant speed, which may be the idling speed of an internal combustion engine.

When the control lever 52 is moved from its 7th to its 8th position, the follower associated with each cam rides from the depression onto the rise thereof. This depresses the push rods 132 and 132′ and automatically adjusts the governors for controlling the prime movers for operation at a higher, substantially constant speed, which may be the full speed of an internal combustion engine, such as a Diesel engine, for example. While the control lever 52 is in any of its 8th, 9th, 10th, 11th or 12th positions, the follower associated with each cam remains on the rise thereof, and therefore, the governors control the prime movers for operation at this predetermined higher speed.

When a power plant of the class described herein is operating under conditions represented by the point G on the curve C (Fig. 2) for example, and the load is suddenly increased for any reason, the increased load may cause the plant to drop back to some point such as the point H on curve A, and while this load remains, the plant may operate along the curve A. If the additional load should be suddenly removed, at the instant of removal, the plant would be operating at the point J on curve C, and the excess power available would cause the propulsion motor to accelerate until conditions represented by the point G on curve C were again restored and the operation would then stabilize at the point G.

When the propulsion motor is operating at a substantially constant speed and the load on this motor is increased, the motor slows down momentarily at least and its armature current increases to provide additional torque. This increases the armature current of the generator and thereby increases the torque required to drive the generator. This in turn slows down the prime mover and causes the governor to respond by increasing the energy available per cycle for operating the prime mover. As previously explained herein, the energy made available per cycle by the governor is variable up to a limited maximum amount. When the prime mover is a Diesel engine and the load is substantially increased, the demand for torque by the generator may be greater than the engine can supply instantaneously. If this demand occurs while operating in the constant engine speed range, the governor may respond by permitting the engine to receive its limited maximum amount of fuel per working stroke until the predetermined speed is substantially restored, when the fuel supplied is cut down automatically in accordance with requirements. By limiting the maximum amount of fuel, overloading of both engine and electrical apparatus, is prevented without recourse to governor control of field differential compounding, overload relays and other such schemes previously used. This applies to both the constant and variable engine speed range of application.

An important advantage of this arrangement is that the prime mover never operates inefficiently. When prime movers such as Diesel engines are used for this purpose and controlled, for example, by a conventional governor, the operation, as a rule, is not entirely satisfactory, due largely to the excessive fuel supplied and consequently excessive smoking, fouling up of the engine, etc., as a result of an effort to bring the engine up to speed during momentary overloads or unusual conditions, such as towing, and engines are habitually operated at full speed regardless of power requirements with resulting difficulty of properly metering and atomizing fuel at light loads and excessive wear on engine and noise caused by this unnecessary speed. In accordance with this invention, the engine is never supplied more than the maximum amount of fuel which it can use efficiently and this maximum permissible amount is reduced automatically by the governor as rapidly as conditions warrant, and the engine is either operated at a certain minimum idling speed or only at such increased speed as is necessary to furnish the power required for the desired propeller speed under the particular conditions prevailing at the time, such as running free, towing, or ice breaking.

The preceding description applies to two aspects of the invention when operating in the variable prime mover speed range, as represented by positions 8 to 12, inclusive, of the control lever. In one of these aspects, the prime mover is operated at constant torque; in the other of these aspects, the prime mover is operated at a variable torque. Operating the prime mover at constant torque involves supplying a constant amount of fuel per stroke to a Diesel engine. This mode of operation is entirely practical for some purposes, as will be understood by those skilled in this art. However, in some installations it is advantageous to vary the brake mean effective pressure and thus the engine torque, as a function of control position or of engine speed by an adjustable fuel limiting stop. This principle of operation becomes embodied in installations of the class described when the maximum amount of fuel which can be supplied per working stroke is limited as a function of engine speed or as a function of control setting, as shown diagrammatically in Figs. 5 and 6. The curves DD' and D"D" are drawn to indicate engine torque increasing as a function of engine speed as representing one desirable mode of operation, as explained above.

In Fig. 5 the governing device is illustrated as comprising a wide range adjustable speed, spring loaded, centrifugal governor 135, having centrifugal weights 136 balanced by the governor spring 137 which is adjustable by the push rod 132 (Fig. 1) in response to movement of the latter by the cam 126. The amount of fuel supplied per working stroke is controlled by vertical movement of a link 138 pivotally connected to one end of a rocker arm 139, the other end of which is adapted to ride in an annular groove formed in the sliding collar 141. As shown, upward movement of the link 138 is adapted to increase the amount of fuel supplied per working stroke. The limit of this upward movement of link 138 is determined by the position of an adjustable stop comprising an arm 142 mounted to pivot about a pin 143 and having a cam surface 144 so shaped as to limit by engagement with the arm 139 the upward movement of link 138 in a manner to give the desired brake mean effective pressure as a function of engine speed when the cam is rotated about its pivot pin 143. In the form shown, this cam is adapted to progressively increase the limit of the amount of fuel supplied per working stroke as a function of engine speed. This is accomplished by means of centrifugal governor 145, comprising centrifugal weights 146 and a governor spring 147. As the speed of the engine increases from approximately 30% to 100% of its rated speed, the collar 148 of governor 145 moves through the full range of its designed travel, as distinguished from a change of only one or two per cent of rated engine speed which is required to move governor 135 through its full range of designed travel. As the governor 145 moves through its designed range of travel, the collar 148, due to its engagement with the arm 142, swings the latter about its pivot and thereby changes the maximum amount of fuel which can be admitted per working stroke.

In Fig. 6, the governor 135' may be identical in construction and arrangement with the governor 135 of Fig. 5, and therefore, like parts of governor 135' are designated by the same reference characters bearing prime marks as those applied to governor 135. In Fig. 6, however, the adjustable stop provided by the cam surface 144' of the pivoted arm 142' is adjusted as a function of control setting. This may be accomplished by means of a link 149 pivotally connected to the arm 142' and to a rocker arm 150 which is pivotally connected to the push rod 132. It will be understood that as the push rod 132 is adjusted vertically by the cam 126, the connections just described will adjust the cam surface 144' to limit the maximum amount of fuel supplied per working stroke as any desired function of control setting. It will be noted that the governors shown in Figs. 5 and 6 may reduce the fuel per working stroke at any time, but they cannot increase the fuel supplied beyond that permitted by the adjustable stop, so that in any emergency such as the breaking of the propeller shaft, or loss of excitation of the generator, the governor 135 or 135' would be effective to limit the engine speed to that for which the governor was set.

The adjustable stops for limiting the maximum amount of fuel per working stroke are intended to function primarily in the upper range of propeller speeds where the engine operates above its idling speed, and normally these stops do not function as such in the lower range of propeller speeds where the engine operates only at its idling speed, but in any emergency such as a short circuit, these stops might be brought into action and serve to limit the torque developed.

The hydraulic governor 155 illustrated in Fig. 7 is also adapted to perform the functions of the speed control governor 135 and of the fuel limiting governor 145. This hydraulic governor comprises a rotary shaft 156 adapted to be positively driven from the engine. This shaft has a longitudinal passage 157 supplied with pressure fluid, such as oil under constant pressure, as from the engine lubricating system. A slidable, non-rotatable cylinder 158 receives the shaft 156 and makes a running fit therewith. The upper end of the shaft is spaced a variable distance from the end of the cylinder to provide a pressure chamber 159 with which the longitudinal passage 157 communicates through a restricting orifice 161. A discharge passage 162 extends from this pressure chamber diagonally across the shaft 156 to a point on the circumference thereof which is always unobstructed by the cylinder 158. It will be understood that the passages 157 and 162 are so arranged as not to intersect.

When the shaft 156 is rotating and pressure fluid is supplied under pressure to passage 157, the chamber 159 will be filled with pressure fluid and the passage will be filled to a point near the center of the shaft 156, as fluid which passes the latter point will be discharged from the lower open end of passage 162 by centrifugal force. That portion of the passage 162 which remains filled with pressure fluid acts as a centrifugal pump and maintains a back pressure on fluid in the chamber 159 which varies as the square of the revolutions of the shaft 156. It will be understood that the features just described will produce a pressure in the chamber 159 which varies as a function of the speed of the prime mover when the speed of the shaft 156 bears a definite relation to the speed of the prime mover. The pressure in the chamber 159 is balanced by the opposing pressure of a compression spring 163 which is adjustable in response to vertical movement of the push rod 132 which in turn is positioned by the cam 126.

The amount of fuel which may be supplied to the engine per working stroke is adapted to be controlled by vertical movement of a reach rod or link 164 which, in the arrangement shown, responds to downward movement to decrease the amount of fuel supplied. A bell crank 166 has one arm 167 thereof pivotally connected to the link 164 and has its other arm 168 connected to a contractile spring 169, and also to an expansible and contractible bellows 171, such, for example, as a Sylphon bellows. Pressure fluid is supplied to this bellows by a flexible connection 172 leading to an annular port 173 in the side wall of the cylinder 158. The port 173 may be provided with a leak-off orifice 174. The port 173 in certain positions of the cylinder 158 communicates with an annular port 175 of a radial passage 176 which supplies operating fluid under pressure from the longitudinal passage 157.

Counter clockwise movement of the bell crank 166 is adapted to be limited by a cam 177 which is rotatably mounted on a pin 178. This cam carries an arm 179 which is connected to a contractile spring 181 and also to an expansible and contractible bellows 182, such, for example, as a Sylphon bellows. Pressure fluid is supplied to the bellows 182 through a flexible connection 183 leading from the pressure chamber 159.

In the operation of this governor, the mean pressure in the chamber 159 is determined by the compression of the spring 163 and a corresponding engine speed. This pressure operates the bellows 182 to actuate the arm 179 and thereby adjust the fuel limiting cam 177 to limit the counter clockwise movement of the bell crank 166, and thus limit, as a function of engine speed, the maximum amount of fuel that can be supplied per working stroke. This mode of operation requires that the spring 181 be so designed that a suitable wide range of engine speeds, say 30 to 100% of maximum engine speed, will be required to cause the cam 177 to move through its designed range of rotary movement.

The bellows 171 and parts associated therewith form an adjustable constant speed governor which may maintain a substantially constant engine speed through the constant speed range of operation, as represented by positions 1 to 7, inclusive, of the control lever 52. Assume, for example, that the engine is operating on the governor at a constant speed in the lower range of propellers speeds. This requires that the position of cylinder 158 be such that the pressure in the chamber 159 is just balanced by the pressure of the compression spring 163. A slight increase in speed of the engine and therefore of shaft 156 will increase the back pressure developed by the pumping action of passage 162, and thereby increase the pressure in chamber 159. This will cause cylinder 158 to be displaced upwardly against the action of the spring 163, thus reducing the sectional flow area between the ports 173 and 175 and thereby reducing the pressure in the bellows 171 and allowing the spring 169 to swing the bell crank 166 in a clockwise direction and reduce the amount of fuel supplied to the engine per working stroke. It will be evident from the foregoing that on a reduction in speed the action will be the reverse of that just described.

As shown in Fig. 8, the fuel limiting stop or cam 177 of the governor 155 of Fig. 7, may be adjustable as a function of control position in a similar manner to that described with reference Fig. 6. As shown in Fig. 8, the arm 179 of the cam 177 may be connected to a link or reach rod 185 which is pivotally connected to an arm 186 of a bell crank 187 having its other arm 188 pivotally connected to a fixed collar 189 on the push rod 132. It will be understood that as the push rod 132 is adjusted vertically, the linkage just described rocks the cam about its pivot.

The principle of this invention, its scope and basic character may be further illustrated by the embodiments shown in Figs. 9 and 10. The embodiment illustrated in Fig. 9 comprises a prime mover, such as a Diesel engine 200, a continuously variable speed gear 201 and a load whose torque increases with speed, such as a marine propeller 202. The crank shaft 203 of the engine may be connected through a suitable clutch 204 to the shaft 206 of the speed gear. This speed gear may be of the toothless type comprising a cone 207 mounted on the shaft 206, an oppositely disposed cone 208 mounted on the propeller shaft 209, and a shiftable belt 210. In considering this aspect of this invention it should be understood that the prime mover may be controlled by any of the governors previously referred to herein and that the variable speed gear 201, as well as the prime mover, may be controlled from a remote point by a single operating member, such as the lever 52, in substantially the same manner as that described with reference to the apparatus illustrated in any or all of the preceding figures of the drawings.

For purposes of illustration, assume that it is desired to operate the propeller 202 at its lowest speed when the prime mover is operating at its idling speed under governor control. This may be accomplished by engaging the clutch 204 when the belt 210 is in the dotted line position (a). Assume that the transmission ratio for this position is such that the engine speed is one-third of the propeller speed. The propeller torque will be comparatively low because of the low propeller speed, but the engine torque at the clutch 204 will be one-third that of the propeller. For increasing propeller speeds, the belt 210 is moved to the left as viewed in Fig. 9, toward its full line position (b). As the belt is moved in this direction, the engine speed is maintained constant at its minimum idling speed by the constant speed governor, propeller torque increases due to the increasing speed, and engine torque increases still faster than does propeller torque, as engine torque equals propeller torque multiplied by the increasing factor of transmission ratio. This increasing engine torque requires the constant speed governor to increase the amount of fuel per stroke to maintain the constant idling speed. To exactly simulate the conditions prevailing in the operation of the Diesel electric plant previously dsecribed, the transmission ratio when the belt 210 arrives at its full line position (b) should be such that the engine torque has reached the maximum amount desired for this engine speed, and the amount of fuel per stroke is limited, as for example, by engagement of arm 168 (Fig. 7) with the cam 177. This operation of progressively shifting the belt 210 from its dotted line position (a) to its full line position (b) corresponds to successively increasing the generator fields with a constant motor field by moving the control lever 52 (Fig. 1) through its positions 1 to 7, inclusive. Under this condition of operation, the speed adjustment, as by cam 126, of the constant speed governor, as governor 155 of Fig. 7, may be increased to full speed without changing engine torque or speed, since engagement of the arm 168 (Fig. 7) with the stop 177 has limited the amount of fuel per stroke, and thus, engine torque. This increase in the governor speed setting, as by increasing the compression of spring 163 in response to movement of cam 126 (Fig. 7) and at the same time shifting the belt 210 slightly to the right, as viewed in Fig. 9, toward its dotted line position (a), corresponds to moving the control lever 52 of Fig. 1 from its seventh to its eighth position. Due to the change in transmission ratio, the substantially constant engine torque at this control position causes a greater torque to be available at the propeller, as the torque now available at the propeller which may be represented by some point such as the point Y on the torque available curve DD' of Fig. 3, is greater than the torque required by the propeller at the propeller speed corresponding to the seventh position of the control lever 52. Therefore, both the propeller and the engine speed will increase until the torque available, represented by the curve DD' (Fig. 2) equals the propeller torque represented by the curve A, as at the point X where these curves intersect. In the same way, further movement of the belt 210 to the right toward its dotted line position (a) corresponds to a further increase of the motor field in the embodiment shown in Fig. 1, and a further increase in the torque available at the propeller corresponding to moving the curve DD', representing the torque available at the propeller, upwardly on the graph to some position such as that represented by the curve D''D'' and increasing the propeller speed to some such point as that represented by the point X'. If the propeller torque-R. P. M. curve should change to conditions represented by the curve B (Fig. 2) the propeller speed would again be that shown by the intersection of the torque available and the torque required curve, such as at the point Z.

The embodiment shown in Fig. 10 may be identical with that shown in Fig. 9, except that in Fig. 10 a variable speed, reversible, hydraulic transmission 212 is substituted for the mechanical variable speed transmission 201 of Fig. 9. Hydraulic transmissions suitable for this purpose may be of the type represented by the Waterbury gear or transmission as disclosed on pages 137 to 141 of part III, chapter 10 of Naval Machinery, 1935 ed., published for the United States Naval Institute, Annapolis, Maryland, by George Bauta Publishing Company, Menasha, Wisconsin. The principle and mode of operation of the embodiment shown in Fig. 10 are the same as just described with reference to the embodiment shown in Fig. 9.

From the foregoing it will be seen that the same principle of controlling the speed of a prime mover so as to operate along a desired torque output revolution curve of the prime mover at variable power outputs by varying the transmission ratio between the prime mover and a load whose torque increases with speed, applies whether the variable transmission is a motor and a generator, a hydraulic device, a mechanical variable speed gear, or any other variable speed transmission. It will also be seen that the invention provides for coordinating the torque output and speed of the prime mover with a variable transmission ratio to obtain a desired speed at which the load is driven, and that this principle of the invention is made inherent in the operation of apparatus of the class described by controlling and maintaining the various instrumentalities and the variable factors thereof in the desirable relationship. It should be understood that the present disclosure is for the purpose of illustration only and that this invention includes all modifications and equivalents which are within the scope of the appended claims.

The invention described herein, if patented, may be manufactured and used by or for the Government for governmental purposes without the payment to me of any royalty thereon.

What I claim is:

1. The combination of a prime mover comprising means for abstracting energy from operating fluid in the production of mechanical power, said prime mover being operable at a predetermined relatively low speed and at greater speeds, a speed governor for varying the amount of operating fluid supplied to the prime mover, means for limiting the maximum amount of operating fluid supplied to the energy conversion chambers of the prime mover at said greater speeds thereof, a load whose torque increases with speed, a variable transmission operable by the prime mover for driving the load, said transmission being operable at prime mover speeds above said predetermined relatively low speed thereof for transmitting power at predetermined decreasing ratios of prime mover to load torque for driving the load at said greater speeds.

2. Apparatus of the class described, comprising the combination of a prime mover comprising means for abstracting energy from operating fluid in the production of mechanical power, said prime mover being operable at a predetermined relatively low speed and at predetermined greater speeds, a speed governor for varying the amount of operating fluid supplied to the prime mover, a variable transmission operable by the prime mover for driving the load, said transmission being operable at prime mover speeds above said predetermined relatively low speed thereof for transmitting power at predetermined decreasing ratios of prime mover to load torque for driving the load at predetermined greater speeds.

3. The combination of a prime mover comprising means for abstracting energy from operating fluid in the production of mechanical power, said prime mover being operable at a predetermined relatively low speed and at greater speeds, a speed governor for varying the amount of operating fluid supplied to the prime mover, means for limiting the maximum amount of operating fluid supplied to the energy conversion chambers of the prime mover as a function of the speed thereof while operating at said greater speeds, a load whose torque increases with speed, a variable transmission operable by the prime mover for driving the load, said transmission being operable at prime mover speeds above said predetermined relatively low speed thereof for transmitting power at predetermined decreasing ratios of prime mover to load torque for driving the load at said greater speeds.

4. The combination of a prime mover comprising means for abstracting energy from operating fluid in the production of mechanical power, said prime mover being operable at a predetermined relatively low speed and at greater speeds, a speed governor for varying the amount of operating fluid supplied to the prime mover, a single control member, means responsive to movement of said control member for limiting the maximum amount of operating fluid supplied to the energy conversion chambers of the prime mover as a function of the setting of said control member while operating the prime mover at said greater speeds thereof, a load whose torque increases with speed, a variable transmission operable by the prime mover for driving the load, said transmission being operable at prime mover speeds above said predetermined relatively low speed thereof for transmitting power at predetermined decreasing ratios of prime mover to load torque for driving the load at said greater speeds.

5. The combination of a prime mover comprising means for abstracting energy from operating fluid in the production of mechanical power, said prime mover being operable at a predetermined relatively low speed and at greater speeds, a speed governor comprising a plurality of governors, one of said governors being responsive to changes in speed of the prime mover for varying the amount of operating fluid supplied thereto, the other of said governors being responsive to speed of the prime mover for limiting the maximum amount of operating fluid supplied to the energy conversion chambers of the prime mover as a function of the speed thereof while operating at said greater speeds, a load whose torque increases with speed, a variable transmission operable by the prime mover for driving the load, said transmission being operable at prime mover speeds above said predetermined relatively low speed thereof for transmitting power at predetermined decreasing ratios of prime mover to load torque for driving the load at said greater speeds.

6. The combination of a prime mover comprising means for abstracting energy from operating fluid in the production of mechanical power, said prime mover being operable at a predetermined relatively low speed and at greater speeds, a speed governor for varying the amount of operating fluid supplied to the prime mover, a control member, an adjustable stop for limiting the amount of operating fluid which may be supplied to the prime mover by the governor, means responsive to movement of the control member for adjusting said stop as a function of the setting of the control member while operating the prime mover at said greater speeds, a load whose torque increases with speed, a variable transmission operable by the prime mover for driving the load, said transmission being operable at prime mover speeds above said predetermined relatively low speed thereof for transmitting power at predetermined decreasing ratios of prime mover to load torque for driving the load at said greater speeds.

7. In a power plant of the class described, the combination of a prime mover comprising means for abstracting energy from operating fluid in the production of mechanical power at a predetermined relatively low speed and at greater speeds, a speed governor for varying the amount of operating fluid supplied to the prime mover, means for limiting the maximum amount of operating fluid supplied to the energy conversion chambers of the prime mover per energy conversion at said greater speeds thereof, a load whose torque increases with speed, a variable transmission comprising an electric generator operable by the prime mover, an electric motor for driving the load and connections for supplying electrical energy from said electric generator to said electric motor, control means for decreasing the ratio of prime mover torque to load torque by increasing the ratio of the motor field to the generator field for driving the load at higher speeds while the prime mover operates in its range of said greater speeds.

8. In a power plant of the class described, the combination of a prime mover comprising means for abstracting energy from operating fluid in the production of mechanical power at a predetermined relatively low speed and at greater speeds, a speed governor for varying the amount of operating fluid supplied to the prime mover, means for limiting the maximum amount of operating fluid supplied to the energy conversion chambers of the prime mover per energy conversion as a function of the speed of the prime mover while operating at said greater speeds thereof, a load whose torque increases with speed, a variable transmission comprising an electric generator operable by the prime mover, an electric motor for driving the load and connections for supplying electrical energy from said electric generator to said electric motor, control means for decreasing the ratio of prime mover torque to load torque by increasing the ratio of the motor field to the generator field for driving the load at higher speeds while the prime mover operates in its range of said greater speeds.

9. In a power plant of the class described, the combination of a prime mover comprising means for abstracting energy from operating fluid in the production of mechanical power at a predetermined relatively low speed and at greater speeds, a speed governor for varying the amount of operating fluid supplied to the prime mover, a movable control member, means responsive to movement of said control member for limiting the maximum amount of operating fluid supplied to the energy conversion chambers of the prime mover per energy conversion as a function of the setting of said control member while operating the prime mover at said greater speeds thereof, a load whose torque increases with speed, a variable transmission comprising an electric generator operable by the prime mover, an electric motor for driving the load and connections for supplying electrical energy from said electric generator to said electric motor, control means for decreasing the ratio of prime mover torque to load torque by increasing the ratio of the motor field to the generator field for driving the load at higher speeds while the prime mover operates in its range of said greater speeds.

10. In a power plant of the class described, the combination of a prime mover comprising means for abstracting energy from operating fluid in the production of mechanical power at a predetermined relatively low speed and at greater speeds, a speed governor comprising a plurality of governors, one of said governors being responsive to changes in speed of the prime mover for varying the amount of operating fluid supplied thereto, the other of said governors being responsive to speed of the prime mover for limiting the maximum amount of operating fluid supplied to the energy conversion chambers of the prime mover per energy conversion as a function of the prime mover speed while operating the prime mover at said greater speeds thereof, a load whose torque increases with speed, a variable transmission comprising an electric generator operable by the prime mover, an electric motor for driving the load and connections for supplying electrical energy from said electric generator to said electric motor, control means for decreasing the ratio of prime mover torque to load torque by increasing the ratio of the motor field to the generator field for driving the load at higher speeds while the prime mover operates in its range of said greater speeds.

11. In a power plant of the class described, the combination of a prime mover comprising means for abstracting energy from operating fluid in the production of mechanical power at a predetermined relatively low speed and at greater speeds, a speed governor for varying the amount of operating fluid supplied to the prime mover, a control member, an adjustable stop for limiting the amount of operating fluid which may be supplied to the prime mover by the governor, means responsive to movement of the control member for adjusting said stop as a function of the setting of the control member while operating the prime mover at said greater speeds thereof, a load whose torque increases with speed, a variable transmission comprising an electric generator operable by the prime mover, an electric motor for driving the load and connections for supplying electrical energy from said electric generator to said electric motor, control means for decreasing the ratio of prime mover torque to load torque by increasing the ratio of the motor field to the generator field for driving the load at higher speeds while the prime mover operates in its range of said greater speeds.

12. In a power plant of the class described, the combination of a prime mover comprising means for abstracting energy from operating fluid in the production of mechanical power at a predetermined relatively low speed and at greater speeds, a speed governor for varying the amount of operating fluid supplied to the prime mover, means for limiting the maximum amount of operating fluid supplied to the energy conversion chambers of the prime mover per energy conversion at said greater speeds thereof, a load whose torque increases with speed, a variable transmission comprising an electric generator operable by the prime mover, an electric motor for driving the load and connections for supplying electrical energy from said electric generator to said electric motor, control means for increasing the ratio of prime mover torque to load torque by increasing the ratio of the field of the generator to the field of the motor while the prime mover is operating at said predetermined relatively low speed thereof, said control means being operable while the prime mover is operating at said greater speeds for increasing the ratio of the motor field to the generator field and thereby decreasing the ratio of prime mover torque to load torque for operating the load at said greater speeds.

13. In a power plant of the class described, the combination of a prime mover comprising means for abstracting energy from operating fluid in the production of mechanical power at a predetermined relatively low speed and at greater speeds, a speed governor for varying the amount of operating fluid supplied to the prime mover, means for limiting the maximum amount of operating fluid supplied to the energy conversion chambers of the prime mover per energy conversion as a function of the speed of the prime mover while operating at said greater speeds thereof, a load whose torque increases with speed, a variable transmission comprising an electric generator operable by the prime mover, an electric motor for driving the load and connections for supplying electrical energy from said electric generator to said electric motor, control means for increasing the ratio of prime mover torque to load torque by increasing the ratio of the field of the generator to the field of the motor while the prime mover is operating at said predetermined relatively low speed thereof, said control means being operable while the prime mover is operating at said greater speeds for increasing the ratio of the motor field to the generator field and thereby decreasing the ratio of prime mover torque to load torque for operating the load at said greater speeds.

14. In a power plant of the class described, the combination of a prime mover comprising means for abstracting energy from operating fluid in the production of mechanical power at a predetermined relatively low speed and at greater speeds, a speed governor for varying the amount of operating fluid supplied to the prime mover, a movable control member, means responsive to movement of said control member for limiting the maximum amount of operating fluid supplied to the energy conversion chambers of the prime mover per energy conversion as a function of the setting of said control member while operating the prime mover at said greater speeds thereof, a load whose torque increases with speed, a variable transmission comprising an electric generator operable by the prime mover, an electric motor for driving the load and connections for supplying electrical energy from said electric generator to said electric motor, control means for increasing the ratio of prime mover torque to load torque by increasing the ratio of the field of the generator to the field of the motor while the prime mover is operating at said predetermined relatively low speed thereof, said control means being operable while the prime mover is operating at said greater speeds for increasing the ratio of the motor field to the generator field and thereby decreasing the ratio of prime mover torque to load torque for operating the load at said greater speeds.

15. In a power plant of the class described, the combination of a prime mover comprising means for abstracting energy from operating fluid in the production of mechanical power at a predetermined relatively low speed and at greater speeds, a speed governor comprising a plurality of governors, one of said governors being responsive to changes in speed of the prime mover for varying the amount of operating fluid supplied thereto, the other of said governors being responsive to speed of the prime mover for limiting the maximum amount of operating fluid supplied to the energy conversion chambers of the prime mover per energy conversion as a function of prime mover speed while operating at said predetermined greater speeds thereof, a load whose torque increases with speed, a variable transmission comprising an electric generator operable by the prime mover, an electric motor for driving the load and connections for supplying electrical energy from said electric generator to said electric motor, control means for increasing the ratio of prime mover torque to load torque by increasing the ratio of the field of the generator to the field of the motor while the prime mover is operating at said predetermined relatively low speed thereof, said control means being operable while the prime mover is operating at said greater speeds for increasing the ratio of the motor field to the generator field and thereby decreasing the ratio of prime mover torque to load torque for operating the load at said greater speeds.

16. In a power plant of the class described, the combination of a prime mover comprising means for abstracting energy from operating fluid in the production of mechanical power at a relatively low speed and at greater speeds, an adjustable speed governor for varying the amount of operating fluid supplied to the prime mover for maintaining the speed of the latter substantially constant at a plurality of speeds thereof, means for limiting the maximum amount of operating fluid supplied to the energy conversion chambers of the prime mover per energy conversion while the prime mover is operating in the range of said greater speeds, an electric generator operable by said prime mover, an electric motor, connections for supplying electrical energy from said electric generator to said electric motor, said electric motor normally being substantially continuously under a load whose torque increases with speed, control means operable through a given range, means responsive to operation of the control means through a portion of its range of operation for successively increasing the ratio of the generator field to the motor field while the governor maintains the speed of the prime mover substantially constant at its relatively low speed, means responsive to operation of the control means beyond said portion of its range of operation for adjusting the governor and controlling the prime mover at a higher predetermined speed, and means responsive to said operation of the control means beyond said portion of its range of operation for successively increasing the ratio of the motor field to the generator field.

17. In a power plant of the class described the combination of a prime mover comprising means for abstracting energy from operating fluid in the production of mechanical power at a relatively low speed and at greater speeds, an adjustable speed governor for varying the amount of operating fluid supplied to the prime mover for maintaining the speed of the latter substantially constant at a plurality of speeds thereof, means for limiting the maximum amount of operating fluid supplied to the energy conversion chambers of the prime mover per energy conversion while the prime mover is operating in the range of said greater speeds, an electric generator operable by the prime mover, an electric motor, connections for supplying electrical energy from the electric generator to the electric motor, the electric motor normally being substantially continuously under a load whose torque increases with speed, an operating member, progressively movable control means operable in sequence through a given range in response to movement of said operating member, means responsive to operation of the control means through a portion of its range of operation for successively increasing the ratio of the generator field to the motor field while the governor maintains the speed of the prime mover substantially constant at its relatively low speed, means responsive to the operation of the control means beyond said portion of its range of operation for adjusting the governor for controlling the prime mover at a higher predetermined speed, and means responsive to said operation of the control means beyond said portion of its range of operation for successively increasing the ratio of the motor field to the generator field.

18. In a power plant of the class described, the combination of a prime mover comprising means for abstracting energy from operating fluid in the production of mechanical power at predetermined speeds, a speed governor for varying the amount of operating fluid supplied to the prime mover for maintaining the speed of the latter substantially constant, said governor being adjustable for limiting the maximum amount of operating fluid supplied to the energy conversion chambers of the prime mover per energy conversion at different speeds thereof, an electric generator operable by said prime mover, an electric motor, connections for supplying electrical energy from said electric generator to said electric motor, said electric motor normally being substantially continuously under a load requiring power substantially in accordance with a predetermined torque-R. P. M. characteristic, control means operable in sequence for successively increasing the voltage produced by said generator and impressed upon said motor while operating said generator at a predetermined low speed of the prime mover, thereby causing said motor to supply power substantially in accordance with a portion of said torque-R. P. M. characteristic, the control means thereafter being operable for adjusting said governor for controlling said prime mover at a higher predetermined speed and thereby increasing the voltage produced by said generator and impressed upon said motor, said control means also being operable for successively increasing the motor torque relative to the generator torque and also the rotative speed of said motor substantially in accordance with the remaining portion of said torque-R. P. M. characteristic while said generator is operating in the range of speeds of said prime mover above said predetermined low speed thereof.

19. In a power plant of the class described, the combination of a prime mover comprising means for abstracting energy from operating fluid in the production of mechanical power at predetermined speeds, a speed governor for varying the amount of operating fluid supplied to the prime mover for maintaining the speed of the latter substantially constant, said governor being adjustable for limiting the maximum amount of operating fluid supplied to the energy conversion chambers of the prime mover per energy conversion at different speeds thereof, an electric generator operable by said prime mover, an electric motor, connections for supplying electrical energy from said electric generator to said electric motor, said electric motor normally being substantially continuously under a load requiring power substantially in accordance with a predetermined torque-R. P. M. characteristic, an operating member, progressively movable control means operable in sequence in response to movement of said operating member, said control means comprising means for successively increasing the voltage produced by said generator and impressed upon said motor while operating said generator at a predetermined low speed of the prime mover, thereby causing said motor to supply power substantially in accordance with a portion of said torque-R. P. M. characteristic, said control means comprising means thereafter operable for adjusting said governor for controlling said prime mover at a higher predetermined speed and thereby increasing the voltage produced by said generator and impressed upon said motor, said control means also comprising means operable for successively increasing the motor torque relative to the generator torque and also increasing the rotative speed of said motor substantially in accordance with the remaining portion of said torque-R. P. M. characteristic, while said generator is operating in the range of speeds of said prime mover above said predetermined low speed thereof.

20. Apparatus of the class described, comprising an electric motor, an electric generator for supplying electrical energy to the electric motor, means for operating the generator at a predetermined substantially constant speed and also at higher speeds, and control means operable while said generator is driven at predetermined substantially constant speed for successively increasing the voltage produced by said generator, said control means being operable while said generator is driven at said higher speeds for concomitantly increasing the rotative speed of said motor and also increasing the motor torque relative to the generator torque in successive increments.

21. Apparatus of the class described, comprising an electric motor, an electric generator for supplying electrical energy to the electric motor, a prime mover for operating the generator at a predetermined substantially constant speed and also at higher speeds, an operating member, generator control means responsive to movement of said operating member while said generator is driven at said predetermined substantially constant speed for successively increasing the voltage produced by said generator, and motor control means responsive to movement of said operating member while said generator is driven at said higher speeds for concomitantly increasing the rotative speed of said motor and also increasing the motor torque relative to the generator torque in successive increments.

22. Apparatus of the class described, comprising an electric motor, an electric generator for supplying electrical energy to the electric motor, a prime mover for operating the generator at a predetermined substantially constant speed and also at higher speeds, an operating member, generator control means responsive to movement of said operating member while said generator is driven at said predetermined substantially constant speed for successively increasing the voltage produced by said generator, prime mover control means responsive to movement of said operating member for changing the speed of said prime mover between said predetermined substantially constant speed and said higher speeds, and motor control means responsive to movement of said operating member while said generator is driven in the range of said higher speeds for concomitantly increasing the rotative speed of said motor and also increasing the motor torque relative to the generator torque in successive increments.

23. Apparatus of the class described, comprising an electric motor, an electric generator for supplying electrical energy to the electric motor, a prime mover for operating the generator at a predetermined substantially constant speed and also at higher substantially constant speeds, an operating member, generator control means responsive to movement of said operating member while said generator is driven at said predetermined substantially constant speed for successively increasing the voltage produced by said generator, a speed governor for the prime mover, said governor being responsive to movement of said operating member for changing the speed of the prime mover between said predetermined substantially constant speed and said higher substantially constant speeds, and motor control means responsive to movement of said operating member while the speed of said prime mover and said generator is being changed from said predetermined substantially constant speed to said higher substantially constant speeds for concomitantly increasing the rotative speed of said motor and also in increasing the motor torque relative to the generator torque in successive increments.

24. The method of operating an electric generator, an electric motor receiving electrical energy from a generator and a prime mover for driving the generator, which comprises operating the prime mover at a predetermined relatively low speed and at greater speeds, limiting the maximum amount of operating fluid supplied to the prime mover per energy conversion at each of said greater speeds thereof, and maintaining the speed of the prime mover substantially constant in the range of said greater speeds thereof by varying the amount of operating fluid supplied per energy conversion up to the limited maximum for each of said greater speeds, successively increasing the ratio of the generator field to the motor field while operating the generator at said relatively low speed of the prime mover, then successively increasing the speed of the prime mover and of the generator to speeds in the range of said greater speeds and successively increasing the ratio of the motor field to the generator field while the prime mover is operating in the range of said greater speeds.

25. The method of operating an electric generator, an electric motor receiving electric energy from the generator and a prime mover for driving the generator, which comprises operating the prime mover at a plurality of speeds, limiting the maximum amount of operating fluid supplied to the prime mover per energy conversion at each of said plurality of speeds thereof and maintaining the speed of the prime mover substantially constant at each of said plurality of speeds by varying the amount of operating fluid supplied per energy conversion up to the limited maximum for each of said plurality of speeds, successively increasing the voltage produced by the generator and impressed upon the motor while operating the generator at one of said plurality of speeds of the prime mover, then increasing the speed of the prime mover and of the generator in the range of said plurality of speeds of the prime mover and successively increasing the torque and the speed of the motor while the generator is operating at another of said plurality of speeds of the prime mover.

26. The method of operating an electric generator, an electric motor receiving electric energy from the generator and an internal combustion engine for driving the generator, which comprises operating the internal combustion engine at a plurality of speeds, limiting the maximum amount of fuel supplied to said engine per working stroke at each of said plurality of speeds thereof and maintaining the speed of said engine substantially constant at each of said plurality of speeds by varying the amount of fuel supplied per working stroke up to the limited maximum for each of said plurality of speeds, successively increasing the voltage produced by the generator and impressed upon the motor while operating the generator at one of said plurality of speeds of said engine, then increasing the speed of said engine and of the generator to another of said plurality of speeds of said engine and successively increasing the torque and the speed of the motor while the generator is operating at said another of said plurality of speeds of said engine.

27. The method of operating an electric generator, an electric motor receiving electric energy from the generator and an internal combustion engine for driving the generator, which comprises operating the internal combustion engine at a plurality of speeds, limiting the maximum amount of fuel supplied to said engine per working stroke at each of said plurality of speeds thereof and maintaining the speed of said engine substantially constant at each of said plurality of speeds by varying the amount of fuel supplied per working stroke up to the limited maximum for each of said plurality of speeds, successively increasing the field excitation of the generator and thereby increasing the voltage impressed upon the motor while operating the generator at one of said plurality of speeds of said engine, then increasing the speed of said engine and of the generator to another of said plurality of speeds of said engine and successively increasing the field excitation of the motor while the generator is operating at said another of said plurality of speeds of said engine.

28. The method of operating an electric generator and an electric motor receiving electrical energy from the generator for driving a load whose torque increases with speed, which comprises successively increasing the ratio of the generator field to the motor field while operating the generator at a predetermined relatively low speed, then successively increasing the speed of the generator through a range of predetermined greater speeds and successively increasing the ratio of the motor field to the generator field while the generator is operating at speeds in the range of said predetermined greater speeds.

29. The method of operating an electric generator and a motor receiving electrical energy from the generator for producing power substantially in accordance with a given torque-speed characteristic, which comprises successively increasing the voltage produced by the generator and impressed upon the motor while operating the generator at a predetermined low speed, then increasing the speed of the generator to predetermined higher speeds and successively increasing the torque and speed of the motor while the speed of the generator is being increased to said predetermined higher speed.

30. The method of operating an electric generator and an electric motor receiving electrical energy from the generator for producing power substantially in accordance with a speed torque characteristic, which comprises maintaining the field excitation of the motor substantially constant and successively increasing the field excitation of the generator substantially to full field excitation while operating the generator at a predetermined low speed, then increasing the speed of the generator to a predetermined higher speed and successively increasing the field excitation of the motor and maintaining the field excitation of the generator substantially constant at substantially full field excitation while the speed of the generator is increased to said predetermined higher speed.

31. The method of operating an electric generator and an electric motor receiving electrical energy from the generator which comprises operating the generator at a low substantially constant speed with comparatively low field excitation and while maintaining the field excitation of the motor at a relatively low value, successively increasing the field excitation of the generator to a predetermined value, maintaining the field excitation of the generator at the latter value while increasing the speed of the generator to a higher substantially constant speed and successively increasing the field excitation of the motor.

32. The method of the class described, which comprises operating a prime mover at a substantially constant and relatively low speed thereof by varying the amount of operating fluid supplied to the prime mover and varying the speed of the load by varying the transmission ratio between the prime mover and the load in the range of powers available at this relatively low speed of the prime mover, and then for greater powers controlling the operating fluid supplied to the prime mover as a function of the speed thereof to give a desired torque-speed curve for the prime mover, and controlling the speed of the prime mover and of the driven load by varying the transmission ratio between the prime mover and the driven load.

33. The method of the class described, which comprises operating a prime mover at a substantially constant and relatively low speed thereof by varying the amount of operating fluid supplied to the prime mover and varying the speed of the load by varying the transmission ratio between the prime mover and the load in the range of powers available at this relatively low speed of the prime mover, and then for greater powers controlling the operating fluid supplied to the prime mover as a function of the transmission ratio between the prime mover and the driven load to give a desired torque-speed curve for the prime mover, and controlling the speed of the prime mover and of the driven load by varying the transmission ratio between the prime mover and the driven load.

34. A power plant comprising an electric motor for driving a load whose torque increases with speed, an electric generator for supplying electrical energy to the electric motor, a displacement type engine for driving the generator at a predetermined low substantially constant speed and also at predetermined higher substantially constant speeds, control means operable through a given range, means responsive to operation of the control means through a portion of its range of operation for successively increasing the ratio of the generator field to the motor field while said generator is operated at said predetermined low substantially constant speed, and means responsive to operation of the control means beyond said portion of its range of operation for successively increasing the ratio of the motor field to the generator field while said generator is operated in the range of said predetermined higher speeds, the relation between the torque of the motor and the torque of the engine being such that the torque of the engine follows a desired speed-torque curve through that part of the range covered by said predetermined higher substantially constant speeds.

35. A power plant comprising an electric motor for driving a load whose torque increases with speed, a generator for supplying electrical energy to the motor, a displacement type engine for driving the generator at a predetermined low substantially constant speed and also at predetermined higher substantially constant speeds, and control means operable while said generator is driven at said predetermined low substantially constant speed for successively increasing the voltage produced by said generator, said control means being operable while said generator is driven at said higher substantially constant speeds for increasing the rotative speed of said motor and also increasing the motor torque relative to the generator torque, the relation between the torque of the motor and the torque of the engine being such that the torque of the engine follows a desired speed-torque curve through that part of the range covered by said predetermined higher substantially constant speeds.

36. The combination of a prime mover comprising means for abstracting energy from operating fluid in the production of mechanical power at a plurality of speeds, a variable transmission operable by the prime mover for driving a load, an adjustable speed governor for varying the amount of operating fluid supplied to the prime mover to maintain the speed of the latter substantially constant at the different speeds thereof, a single control member for controlling the prime mover and the variable transmission, means responsive to movement of said control member for adjusting the governor to maintain the speed of the prime mover substantially constant at different prime mover speeds and for varying said transmission for decreasing the ratio of the prime mover torque to the load torque to increase the speed of the prime mover and of the load to give a desired torque-speed curve for the prime mover.

37. In an apparatus of the class described, the combination of a prime mover comprising means for abstracting energy from operating fluid in the production of mechanical power at a relatively low speed and at predetermined greater speeds, an adjustable speed governor for varying the amount of operating fluid supplied to the prime mover for maintaining the speed of the latter substantially constant at said relatively low speed and at each of said greater speeds thereof, a variable transmission operable by the prime mover for driving a load, an operating member, progressively movable control means operable in sequence through a given range in response to movement of said operating member, means responsive to operation of the control means through a portion of its range of operation for varying said transmission for successively increasing or decreasing the ratio of the prime mover torque to the load torque while the governor maintains the speed of the prime mover substantially constant at its relatively low speed for respectively increasing or decreasing the speed of the load in the range of powers available at said relatively low speed of the prime mover, means responsive to the operation of the control means beyond said portion of its range of operation for adjusting the governor for controlling the prime mover in the range of said predetermined greater speeds, and means responsive to operation of the control means beyond said portion of its range of operation for varying said transmission for successively decreasing or increasing, respectively, the ratio of the prime mover torque to the load torque for respectively increasing or decreasing the speed of the prime mover and of the load to give a desired torque-speed curve for the prime mover.

38. In a power plant of the class described, the combination of a prime mover comprising means for abstracting energy from operating fluid in the production of mechanical power at a relatively low speed and at predetermined greater speeds, an adjustable speed governor for varying the amount of operating fluid supplied to the prime mover for maintaining the speed of the latter substantially constant at said relatively low speed and at each of said greater speeds, an electric generator operable by the prime mover, an electric motor for driving a load, connections for supplying electrical energy from the electric generator to the electric motor, a single control member, progressively movable control means operable in sequence through a given range in response to movement of said single control member, means responsive to operation of said control means through a portion of its range of operation for increasing and decreasing the ratio of the generator field to the motor field while the governor maintains the speed of the prime mover substantially constant at its relatively low speed for respectively increasing and decreasing the speed of the load in the range of powers available at said relatively low speed of the prime mover, means responsive to the operation of the control means beyond said portion of its range of operation for adjusting the governor for controlling the prime mover in the range of said predetermined greater speeds thereof, and means responsive to said operation of the control means beyond said portion of its range of operation for respectively increasing and decreasing the ratio of the motor field to the generator field for respectively increasing and decreasing the speed of the prime mover and of the load to give a desired torque-speed curve for the prime mover.

39. An apparatus of the class described, the combination of a prime mover comprising means for abstracting energy from operating fluid in the production of mechanical power at a relatively low speed and at predetermined greater speeds, an adjustable speed governor for varying the amount of operating fluid supplied to the prime mover for maintaining the speed of the latter substantially constant at the speeds thereof, means for limiting the maximum amount of operating fluid supplied to the energy conversion chambers of the prime mover per energy conversion while the prime mover is operating in the range of said predetermined greater speeds, a variable transmission operable by the prime mover for driving a load, an operating member, progressively movable control means operable in sequence through a given range in response to movement of said operating member, means responsive to operation of the control means through a portion of its range of operation for varying said transmission for successively increasing or decreasing the ratio of prime mover torque to the load torque while the governor maintains the speed of the prime mover substantially constant at its relatively low speed, means responsive to the operation of the control means beyond said portion of its range of operation for adjusting the governor for controlling the prime mover at a higher predetermined speed, and means responsive to said operation of the control means beyond said portion of its range of operation for varying said transmission for decreasing the ratio of the prime mover torque to the load torque.

HERMAN H. CURRY.

CERTIFICATE OF CORRECTION.

Patent No. 2,290,867.  July 28, 1942.

HERMAN H. CURRY.

It is hereby certified that error appears in the printed specification of the above numbered patent requiring correction as follows: Page 6, second column, line 28, after "direction" insert --of rotation--; page 7, first column, line 30, strike out the comma after "apparatus"; page 9, first column, line 43, for "dsecribed" read --described--; page 12, first column, line 34-35, strike out the word "predetermined"; and that the said Letters Patent should be read with this correction therein that the same may conform to the record of the case in the Patent Office.

Signed and sealed this 29th day of September, A. D. 1942.

(Seal)

Henry Van Arsdale,
Acting Commissioner of Patents.